United States Patent [19]

Lazaridis

[11] Patent Number: 4,771,085

[45] Date of Patent: Sep. 13, 1988

[54] CURABLE DIELECTRIC COMPOSITIONS

[75] Inventor: Christina N. Lazaridis, Wilmington, Del.

[73] Assignee: E. I. Du Pont de Nemours and Company, Wilmington, Del.

[21] Appl. No.: 127,577

[22] Filed: Dec. 3, 1987

Related U.S. Application Data

[63] Continuation-in-part of Ser. No. 916,329, Oct. 7, 1986, abandoned.

[51] Int. Cl.[4] .......................... C08F 2/50; C08L 63/10

[52] U.S. Cl. ......................................... 522/77; 522/83; 522/103; 522/121; 523/466; 525/108; 525/112; 525/922

[58] Field of Search ................... 522/77, 83, 121, 103; 523/466; 525/108, 112, 922

[56] References Cited

U.S. PATENT DOCUMENTS

| | | | |
|---|---|---|---|
| 3,892,819 | 7/1975 | Najvar | 521/54 |
| 3,909,480 | 9/1975 | Ogata | 523/466 |
| 4,097,569 | 6/1978 | Waters | 525/112 |
| 4,459,193 | 7/1984 | Ratcliffe | 522/77 |

FOREIGN PATENT DOCUMENTS

| | | | |
|---|---|---|---|
| 1151789 | 8/1983 | Canada | 523/466 |

*Primary Examiner*—John C. Bleutge
*Assistant Examiner*—David Buttner

[57] ABSTRACT

A printable dielectric composition comprising finely divided particles of talc and/or mica dispersed in a curable liquid composition containing acrylated rubber modified epoxy resin oligomer, acrylated polydiene oligomer and alkyl acrylate.

7 Claims, No Drawings

CURABLE DIELECTRIC COMPOSITIONS

CROSS-REFERENCE TO RELATED APPLICATION

This application is a continuation-in-part of co-pending U.S. patent application Ser. No. 916,329 filed Oct. 7, 1986, now abandoned.

FIELD OF INVENTION

The invention is directed to novel curable dielectric compositions and especially to such compositions for use in membrane touch switches.

BACKGROUND OF THE INVENTION

The membrane touch switch is a normally open, low voltage, pressure-sensitive device currently being used in a wide variety of applications, including appliances, electronic games, keyboards and instrumentation. It is usually fabricated as a three-layer sandwich with the conductive traces printed on the inner sides of the top and bottom layers which are separated by a spacer sheet. Pressure applied to the top layer establishes momentary electrical contact between the top and bottom layers through punched openings in the spacer sheet. Both flexible and rigid switches are available. The former are typically printed over a flexible polyester base, while the latter use a printed circuit board bottom panel.

Ease of design and manufacture allow touch switches to cost less than their electromechanical counterparts. Nevertheless, it is still imperative that they be made from high reliability electronic materials and that these materials be compatible with each other. Since the high cure temperatures of the many inks available for cermet applications are not suitable for polymeric substrates, many polymer thick film conductors and dielectrics have been developed for this application. A variety of chemistries is currently used for both types of inks, and a variety of processing options are used as well.

In practice, most manufacturers first select a conductive ink, then look for a compatible dielectric. The selection is especially critical in this application since the dielectric is used both to insulate the conductor, to allow crossovers, and to encapsulate it to prevent environmental damage. However, lack of adequate adhesion of the dielectric to the substrate and/or to the conductive ink has resulted in limited market penetration for many dielectric compositions, especially those which are UV curable.

Existing manufacturing processes dictate that the dielectric be screen-printable and either thermally curable or UV light curable. Faster cures which can be obtained with the latter make it the more cost-effective approach and the wide availability of UV curing units makes this a practical route. The dielectric must be compatible with the conductive ink and must meet certain performance standards. It must cure to a flexible, abrasion-resistant film, free of pinholes with good adhesion to the substrate and to the conductive ink. Crossover applications also require that the conductive ink have good adhesion to the dielectric and, frequently, good adhesion of the dielectric to itself is also specified. Electrical requirements call for a low dielectric constant, high insulation resistance and high breakdown voltage. The physical and electrical properties must not degrade under a variety of environmental conditions.

In an assembled switch, dielectric failure can lead to either electrical or physical breakdown of the switch. Both materials vendors and switch manufacturers rigorously test components under fresh and accelerated aging conditions to decrease the probability of this occurrence. Electrical failure implies that shorting has occurred because of pinholes, the presence of conductive impurities in the formulation, dielectric failure under load, or other stressful environmental conditions. Physical failures originate from blistering, softening or cracking, any of which can occur during the manufacturing process or during use. Blistering may be due to incompatibility of the dielectric with the conductor or the substrate, as well as from moisture susceptibility. Softening can occur under high humidity conditions or with solvent from a conductor ink, and cracking can result from the inherent brittleness of a cured composition. All of these problems can be prevented with appropriately formulated inks.

A more difficult problem is that of adhesive loss and since this is intimately related to the substrate, the problem is compounded by the large number of available substrates. While polyester films are the most widely used in touch switches, polycarbonate and polyimide films are occasionally encountered. Each film manufacturer typically offers several grades of each product, with different surface characteristics due to variable processing techniques and/or surface pretreatments. The films may also be given a heat treatment to reduce shrinkage in later curing steps.

Different polyester films have different physical surfaces. For example, both Mylar® EL 500 and 500D(7) polyester films show evidence of rough surfaces due to slip pretreatment to allow easy handling of these films, while Melinex® 0(6) polyester film has an extremely smooth surface. The Mylar® 500D polyester film has much smaller particulates than the Mylar® EL 500 polyester film, giving it a clear appearance while the Mylar® EL 500 has a cloudy appearance. The Melinex® 0 polyester film is also very clear but suffers from poor handleability and tends to stick to itself. As might be predicted, adhesion to these surfaces is quite variable and indirectly related to surface smoothness—the Melinex® 0 polyester film generally giving the poorest values. Since membrane switch manufacturers often select their substrates not for microscopic structure but for reasons of cost, dimensional stability and visual appearance, the physical surface characteristics are frequently overlooked, yet may be critical to the performance of an ink from the standpoint of adhesion.

SUMMARY OF THE INVENTION

The invention is therefore directed in its primary aspect to an improved screen printable dielectric composition having superior adhesion to a wide variety of substrates which is a printable dielectric composition comprising:

a. 25–35% wt. finely divided particles of an inorganic adhesion agent selected from talc, mica and mixtures thereof dispersed in b. 75–65% wt. curable liquid composition comprising:

(1) 20–50% wt. acrylated diene rubber-modified epoxy resin oligomer;

(2) 5–25% wt. elastomeric acrylated polydiene oligomer; and (3) 35–75% wt. alkyl acrylate.

In a second aspect, the invention is directed to the above compositions which have been cured to form a continuous solid phase of acrylated diene rubber-modified epoxy resin oligomer having dispersed therein elastomeric areas of acrylated polydiene oligomer and finely divided particles of inorganic adhesion agent.

In a third aspect, the invention is directed to membrane touch switches comprising upper and lower flexible layers having facing electrically conductive areas separated by an adherent spacer layer of the above-described composition.

In yet another aspect, the invention is directed to membrane touch switches comprising upper and lower flexible layers having facing electrically conductive areas separated by an adherent spacer layer and having electrically conductive traces leading therefrom encapsulated within a layer of the above-described composition.

In a still further aspect, the invention is directed to a membrane touch switch comprising upper and lower flexible layers, at least one of which layers has a plurality of overlying electrically conductive areas, each separated from the other by a layer of the above-described composition.

Adhesion Testing

The most widely accepted criterion for measuring the adhesion of membrane switch materials is the tape test described by ASTM D3359-78, Method B. For films under 5 mils thickness, it requires that a 10×10 grid pattern be made with a sharp cutting instrument through the cured ink to the surface of the substrate. A device for this purpose is available from the Gardner/-Neotec Instrument Division of Pacific Scientific. A pressure-sensitive tape, such as 3M Scotch ®(10) Brand 810, is applied over the grid pattern and then removed with a continuous, nonjerking motion. Depending on the extent of ink removal, the adhesion is rated from 0B to 5B, the highest rating representing no ink removal.

Many of the inks which fail this crosshatch test nevertheless exhibit acceptable adhesion in a simple tape pull test. This implies that adhesion loss is due to delamination of the ink from the substrate due to the excess energy imparted to the ink during the cutting operation. Unless this energy can be stopped from traveling laterally across the ink substrate interface, these inks will give poor crosshatch adhesion. It is frequently observed that inks with nominal crosshatch adhesion pass or fail depending on the type of cutting pattern; few cuts widely spaced impart less energy than several cuts close together on the same unit area. The ASTM test described above is designed to make crosshatch testing more reproducible by quantifying the transverse forces applied in any particular situation.

Prior Art

To survive the stress of crosshatching, polymeric inks need to be toughened so that the applied forces are absorbed or dissipated in the vicinity of the cuts and are thus prevented from traveling to the ink substrate interface. One way of doing this is to increase the degree of crosslinking. Yet this technique can be counterproductive in that the resulting composition may become too brittle for a touch switch ink. Another method is to rubber-toughen the formulation with elastomeric inclusions, a technique widely used in epoxy chemistry. Yet a third method is to use rigid filler particles such as alumina, silica and glass spheres. Recent studies reported have combined these last two approaches in epoxy systems to give hybrid-particulate composites. In these systems, dispersed rubbery particles enhance the extent of localized plastic shear deformations around the crack tip, while the rigid particles increase crack resistance by a crack-pinning mechanism.

Preliminary work with an experimental rubber-toughened curable dielectric composition showed it to have excellent crosshatch adhesion to a rough surface such as Mylar ® EL 500 polyester film, but not to a smoother surface such as Melinex ® 0 polyester film. This can be explained by the greater surface area encountered by the dielectric in the former case, thus requiring additional force for delamination. Analogous compositions containing rigid filler particles but without the rubber fillers gave poor crosshatch adhesion to both rough and smooth polyester surfaces. A dielectric formulated as a hybrid-particulate composite, on the other hand, has been found to have excellent crosshatch adhesion to a wide variety of substrates, including a gamut of plastic films with widely differing surfaces. The improved adhesion is attributed both to a rubber-toughening mechanism and to crack-pinning of the filler. The rigid filler particles were found to contribute much less to the overall toughness (and thus adhesion) since the analogous compositions without the elastomeric inclusions gave very poor crosshatch adhesion.

Detailed Description of the Invention

The invention is therefore directed to a novel curable dielectric composition having excellent adhesion to a wide variety of polyester surfaces which contains both elastomeric and rigid fillers. As used herein, the terms "curing" and "crosslinking" refer to the hardening of the liquid polymers which results from polymerization and/or crosslinking. By the appropriate choice of free radical initiators, curing can be initiated by UV light or by the action of heat. Compositions which are curable by the action of UV light are preferred. The selection of such initiators and initiation systems is well within the skill of the art. For example, a discussion of photoinitiators is given in U.S. Pat. No. 4,615,560 to Dueber et al.

Such elastomeric fillers might be added to dielectric compositions in a variety of ways; for example, micron size core-shell polymers such as those disclosed by Burk in U.S. Pat. No. 3,313,748 were blended with the dielectric. Another approach was to blend elastomeric polymers such as polyisoprene in the formulation. While both of these technical approaches were effective to some extent, by far the most effective technique has been that of choosing monomers and oligomers which contribute both elastomeric and nonelastomeric character to the final composition.

Therefore, in accordance with the invention, rubber fillers are incorporated into the composition by means of both an acrylated rubber modified epoxy resin oligomer and an acrylated polybutadiene oligomer. The rheology of the system is then adjusted by the use of alkyl acrylates. A mixture of mono- and di-functional alkyl acrylates is particularly preferred for this purpose.

A. Inorganic Adhesion Agent

A wide variety of inorganic fillers has been tested for use as an adhesion agent for the composition of the invention. (See Examples 3-14 infra.) Interestingly, even though the prior art would indicate that a wide variety of filler materials would function effectively, it has been found that the composition of the filler which can be used in the invention is quite critical. Only talc and mica have been found to be effective to attain the high degree of adhesion afforded by the composition of the invention.

The purity of the talc and mica does not seem to be critical and ordinary commercial grades of these materials are satisfactory for use in the invention. Unlike talc, which has a single theoretical chemical composition ($3MgO.4SiO_2.H_2O$), mica occurs as several different forms of aluminum silicate, of which muscovite and phlogopite have appreciable commercial usage. Either of these is suitable for use in the invention. Mixtures of talc and mica can be used without disadvantage.

At least 25% wt. of the talc and/or mica are required to obtain the desired level of adhesion for the compositions of the invention. However, more than about 35% wt. of these adhesive agents is detrimental in that the cured composition may become too inflexible.

The talc and mica used in accordance with the invention may be treated with a silane coupling agent to effect bonding of the filler to the organic polymer constituents of the liquid curable component. This mainly improves the aging qualities of the composition, especially under environmental stress conditions.

Typical silane coupling agents have the structure $R—Si—(—OR'—)_3$ in which R is an organo functional group which reacts with the organic polymer and OR', is an hydrolyzable group which hydrolyzes to yield $(R—Si—(—OH—)_3$ which condenses with —Si—OH groups on substrates to yield a —Si—O—Si bond. The various silanes contain different kinds of organofunctional groups. Available silane coupling agents include amino-functional silane, methacrylate-functional cationic silane, polyamino-functional silane, mercapto-functional silane, vinyl-functional silane and chloroalkyl-functional silane.

B. Epoxy Resin Oligomer

An essential ingredient of the curable liquid component of the invention and the primary rubbery material is the acrylated diene rubber-modified epoxy resin oligomer. These materials are prepared by reacting the epoxide moieties of a polyepoxide with the acid moieties of an unsaturated monocarboxylic acid and a liquid carboxyl-terminated homopolymer or copolymer of a conjugated diene. The preparation of these materials is described in U.S. Pat. Nos. 3,892,819 to Najvar and in 3,928,491 to Waters. A preferred oligomer of this type is the reaction product of a bisphenol A-derived epoxy resin with acrylic acid and a carboxyl-terminated butadiene/acrylonitrile copolymer. The acrylated rubber-modified epoxy resin oligomer should constitute 20–50% wt. of the curable liquid component and preferably 35–45% wt.

C. Acrylated Polydiene Oligomer

A second essential ingredient of the curable liquid component and the secondary rubbery material is the acrylated polydiene oligomer. These materials are liquid rubbers and are available primarily as acrylates, preferably diacrylates. They are prepared from low molecular weight liquid conjugated diene/oligomers having a molecular weight of 2–4,000. A molecular weight of 3,000 has been particularly effective. Vinyl content of the oligomers is on the order of 15–30% wt., 20–25% wt. vinyl content being preferred. Acrylated oligomers of either butadiene or isoprene can be used in this application.

The polydiene oligomer should be 5–25% wt. of the composition and is preferably used in a lesser amount than the epoxy resin oligomer. From 7 to 20% wt. of the acrylated polydiene, particularly polybutadiene, is especially preferred.

The acrylated polydiene oligomers retain their elastomeric properties after curing and have a Tg no higher than about 20° C.

D. Alkyl Acrylates

Alkyl acrylates in some instances constitute a major part of the curable liquid component of the invention. In all cases, the alkyl acrylates must be liquid at room temperature. Both mono- and multi-functional acrylates can be used in the invention. However, the amount of tri- and higher functionality acrylates must be limited to 10% wt. or less of the curable liquid component in order to avoid excessive crosslinking and shrinkage of the composition. It is therefore preferred to employ only mono- and di-functional liquid alkyl acrylates in an amount of 35–80% wt. of the total curable liquid component. From 40 to 60% wt. is still further preferred.

Quite surprisingly, better adhesion results have been obtained using a mixture of mono-functional acrylates (30–60%) and di-functional acrylates (5–20%). More nearly optimum properties have been obtained when the mono-functional and di-functional acrylates constitute respectively 35–45% wt. and 7.5–15% wt. of the curable liquid component.

Suitable alkyl acrylates include but are not limited to acrylates and the corresponding methacrylates listed below:

allyl acrylate
tetrahydrofurfuryl acrylate
triethyleneglycol diacrylate
ethyleneglycol diacrylate
polyethyleneglycol diacrylate
1,3-butyleneglycol diacrylate
1,4-butanediol diacrylate
diethyleneglycol diacrylate
1,6-hexanediol diacrylate
neopentylglycol diacrylate
2-(2-ethoxyethoxy)ethyl acrylate
tetraethyleneglycol diacrylate
pentaerythritol tetraacrylate
2-phenoxyethyl acrylate
ethoxylated bisphenol A diacrylate
trimethylolpropane triacrylate
glycidyl acrylate
isodecyl acrylate
dipentaerythritol monohydroxypenta acrylate
pentaerythritol triacrylate
2-(N,N-diethylamino)ethyl acrylate
hydroxy lower alkyl acrylates such as hydroxyethyl acrylate, hydroxypropyl acrylate, hydroxyhexyl acrylate
benzoyloxyalkyl acrylates such as benzoyloxyethyl acrylate and benzoyloxyhexyl acrylate
cyclohexyl acrylate
n-hexyl acrylate
dicyclopentenylacrylate
N-vinyl-2-pyrrolidone
isobornyl acrylate
isooctyl acrylate
n-lauryl acrylate
2-butoxyethyl acrylate
2-ethylhexyl acrylate
2,2-methyl-(1,3-dioxolan-4-yl)methyl acrylate.

In the case of monofunctional acrylates, it is preferred that they be of higher molecular weight and therefore of lower volatility. As can be seen from the above list, the alkyl moiety of the acrylate can be substituted with virtually any inert organic group so long as the resultant acrylate remains liquid at room temperature and is miscible in the above described acrylated polydiene oligomers. A preferred alkyl acrylate combination is dicyclopentenyloxyethyl acrylate and tripropyleneglycol diacrylate. (See Examples 1 and 2.)

E. Additives

In addition to the above-described primary constituents, the composition of the invention may also contain various secondary materials to add to or enhance its properties such as elastomeric polymers, free radical initiators to render the composition curable either thermally or by UV light, pigments (soluble or insoluble) and various printing aids such as leveling agents, antifoam agents and thickeners. These materials are well known in the art and do not constitute a criterion on which the nonobviousness of the invention is based.

F. Formulation

The compositions of the invention are not difficult to formulate in that simple low energy mixing is sufficient to facilitate solution. While it is necessary that the compositions form stable admixtures, it is not necessary that the compositions be completely soluble in each other. In fact, some immiscibility of these blends was anticipated, which upon UV curing leads to microscopic phase separation and hence to a multiple phase structure.

Consequently, after these materials are UV-cured, they form a structure having two solid phases: (1) a discontinuous phase rich in rubber content which is dispersed in (2) a matrix of epoxy-rich solids. The rubbery phase has a Tg of below about 20° C. and the epoxy-rich phase has a Tg of above 20° C., especially 50° C. or higher. [Glass transition temperatures (Tg) were measured by dielectric thermal analysis (DETA).]

G. Test Procedures

Polyester film substrates employed for adhesion testing are commercially available 5 mil thick (127 microns) films. The several grades evaluated are specified in the examples. The polyimide substrate is also commercially available 5 mil thick (127 microns) film sold under the tradename Kapton ®(3) by the Du Pont Company. The polycarbonate film is commercially available 5 mil thick (127 microns) from General Electric under the tradename Lexan ®(4). The polymeric silver conductive ink is commercially available as product 5007(9) from the Du Pont Company.

Prints measuring 1 square inch were made through a 280-mesh stainless steel screen to give 1 to 1.1 mil (25.4 to 27.9 microns) thick test patterns. Adhesion tests to silver were made over 5007 silver conductor previously cured over Mylar ® EL 500 polyester film. The 5007 was printed with a 280-mesh stainless steel screen and cured at 120° C. for 10 minutes. Silver print thickness was 0.5 to 0.7 mils (12.7 to 17.8 microns).

Adhesion results reported refer to crosshatch adhesion run according to ASTM D3359-78 using Method B in which a lattice pattern of 11 cuts in each direction is made in the dielectric to the substrate, pressure-sensitive tape is applied over the lattice and then removed and the adhesion rated according to the degree of removal according to the following scale:

- 5B The edges of the cuts are completely smooth; none of the squares of the lattice is detached.
- 4B Small flakes of the coating are detached at intersections; less than 5% of the area is affected.
- 3B Small flakes of the coating are detached along edges and at intersections of cuts. The area affected is 5 to 15% of the lattice.
- 2B The coating has flaked along the edges and on parts of the squares. The area affected is 15 to 35% of the lattice.
- 1B The coating has flaked along the edges of cuts in large ribbons and whole squares have detached. The area affected is 35 to 65% of the lattice.
- 0B Flaking and detachment worse than Grade 1. All adhesion tests were run with ¾ inch wide 3M Scotch ® tape #810 using a Cross Hatch Cutter from the Gardner/Neotec Instrument Division of Pacific Scientific with a medium blade (eleven teeth with 1.5 mm spacings).

All dielectric prints were cured under untraviolet light on an RPC Industries QC ®(8) Processor Model 1202 AN containing two 200 W/linear inch (79 W/linear cm) medium pressure mercury vapor light bulbs, running at 40 ft/min (20.3 cm/sec); the samples were cured in air approximately 3 inches from the lamps.

EXAMPLES

Two initial compositions in accordance with the invention were formulated using talc and mica respectively as the rigid filler adhesive agents (Examples 1 and 2). Then a series of twelve more compositions was made in which other well known rigid fillers were substituted for the mica and talc. A list of the rigid fillers used in the 20 examples is given in Table I below, while the adhesive properties of each formulation are given in Table II.

In Examples 15–20, several adhesive compositions were formulated to show various criticalities with respect to the liquid component. Finally, in Example 21 a composition was formulated identical to Example 1 except that the rigid filler was omitted altogether.

Additional data for all 20 examples in which a wide variety of substrates was tested are given in Table II.

TABLE I

| Ex. No. | Candidate Adhesion Agents |
|---|---|
| 1 | Talc |
| 2 | Mica |
| 3 | Sodium-A-zeolite |
| 4 | Hydrated silicate clay |
| 5 | Titanium dioxide |
| 6 | Alumina |
| 7 | Calcium carbonate |
| 8 | Alumina trihydrate |
| 9 | Trimethylolpropane triacrylate microgel |
| 10 | Silica, low quartz, natural microcrystalline "amorphous" |
| 11 | Silica, amorphous-fumed |
| 12 | Silica, low quartz, natural microcrystalline, novaculite |
| 13 | Silica, diatomaceous |
| 14 | Silica, silica gel |
| 15–20 | Talc |
| 21 | Control, no Adhesion Agent |
| 22 | Talc |
| 23 | Talc |
| 24 | Talc |

EXAMPLE 1

A UV curable mixture was made from 26.09% wt. of an acrylated rubber-modified epoxy resin, 7.34% wt. of an acrylated polybutadiene oligomer, 26.22% wt. of dicyclopentenyloxyethyl acrylate, 6.52% wt. of tripropyleneglycol diacrylate, 0.17% wt. of a predispersed copper phthalocyanine pigment in trimethylolpropane triacrylate (20:80), 2.44% wt. of 2-hydroxy-2-methyl-1-phenyl-1-propanone, 0.69% wt. of 2,2-diethoxyacetophenone, 0.53% wt. of a silicone printing aid and 30.0% wt. talc. After printing and curing, this composition gave excellent crosshatch adhesion over a broad spectrum of substrates, as shown in Table II.

EXAMPLE 2

Example 1 is repeated, except that mica is used in place of talc. After printing and curing, this composition also gave excellent crosshatch adhesion over a broad spectrum of substrates, as shown in Table II.

EXAMPLES 3-14

Example 1 is repeated, except that talc is replaced by other filler candidates, as shown in Table II. These compositions do not show the excellent adhesion to a wide spectrum of substrates shown by Examples 1 and 2, in which talc and mica were used.

EXAMPLE 15

Example 1 is repeated, except that the acrylated rubber-modified epoxy resin is replaced by an acrylated epoxy resin. This composition does not show the excellent adhesion to a wide spectrum of substrates shown by Example 1.

EXAMPLE 16

Example 1 is repeated, except that the acrylated rubber-modified epoxy resin is replaced by an acrylated aromatic urethane resin. This composition does not show the excellent adhesion to a wide spectrum of substrates shown by Example 1.

EXAMPLE 17

Example 1 is repeated, except that the acrylated polybutadiene oligomer is replaced by an equivalent amount of tripropylene glycol diacrylate. This composition does not show the excellent adhesion to a wide spectrum of substrates shown by Example 1.

EXAMPLE 18

Example 1 is repeated, except that the acrylated polybutadiene oligomer and the dicyclopentenyloxyethyl acrylate are both replaced by an equivalent amount of tripropylene glycol diacrylate. This composition does not show the excellent adhesion to a wide spectrum of substrates shown by Example 1.

EXAMPLE 19

Example 1 is repeated, except that the dicyclopentenyloxyethyl acrylate is replaced by an equivalent amount of tripropylene glycol diacrylate. This composition does not show the excellent adhesion to a wide spectrum of substrates shown by Example 1.

EXAMPLE 20

Example 1 is repeated, except that the acrylated polybutadiene oligomer and the tripropylene glycol diacrylate are both replaced by dicyclopentenyloxyethyl acrylate. This composition does not show the excellent adhesion to a wide variety of substrates shown by Example 1.

EXAMPLE 21

Example 1 is repeated, except that the talc was omitted from the composition. This composition did not show adequate adhesion to the wide variety of substrates as did the corresponding talc containing compositions of Examples 1 and 2.

EXAMPLE 22

A UV curable mixture was made from 13.30% wt. of an acrylated rubber-modified epoxy resin, 13.23% wt. of an acrylated polybutadiene oligomer, 36.33% wt. of dicyclopentenyloxyethyl acrylate, 3.31% wt. of tripropyleneglycol diacrylate, 0.17% wt. of a predispersed copper phthalocyanine pigment in trimethylolpropane triacrylate (20:80), 2.44% wt. of 2-hydroxy-2-methyl-1-phenyl-1-propanone, 0.69% wt. of 2,2-diethoxyacetophenone, 0.53% wt. of a silicone printing aid, and 30.0% wt. talc. After printing and curing, this composition gave excellent crosshatch adhesion over a broad spectrum of substrates, as shown in Table II.

EXAMPLE 23

A UV curable mixture was made from 38.94% wt. of an acrylated rubber-modified epoxy resin, 3.31% wt. of an acrylated polybutadiene oligomer, 14.23% wt. of dicyclopentenyloxyethyl acrylate, 9.73% wt. of tripropyleneglycol diacrylate, 0.17% wt. of a predispersed copper phthalocyanine pigment in trimethylolpropane triacrylate (20:80), 2.44% wt. of 2-hydroxy-2-methyl-1-phenyl-1-propanone, 0.69% wt. of 2,2-diethoxyacetophenone, 0.53% wt. of a silicone printing aid, and 30.0% wt. talc. After printing and curing, this composition did not give the excellent crosshatch adhesion over a broad spectrum of substrates, as shown in Table II.

EXAMPLE 24

A UV curable mixture was made from 38.94% wt. of an acrylated ribber-modified epoxy resin, 3.31% wt. of an acrylated polybutadiene oligomer, 10.72% wt. of dicyclopentenyloxyethyl acrylate, 13.23% wt. of tripropyleneglycol diacrylate, 0.17% wt. of a predispersed copper phthalocyanine pigment in trimethylolpropane triacrylate (20:80), 2.44% wt. of 2-hydroxy-2-methyl-1-phenyl-1-propanone, 0.69% wt. of 2,2-diethoxyacetophenone, 0.53% wt. of a silicone printing aid and 30.0% wt. talc. After printing and curing, this composition also did not give excellent crosshatch adhesion over a broad spectrum of substrates, as shown in Table II.

TABLE II

Crosshatch Adhesion of Various Compositions to Polymer Films

| Ex. No. | Du Pont Mylar ® EL 500 Polyester | Du Pont Mylar ® 500D Polyester | Toray Lumirror ® T-60 Polyester |
|---|---|---|---|
| 1 | 5B | 5B | 5B |
| 2 | 5B | 5B | 5B |
| 3 | 5B | 5B | 2B |
| 4 | 1B | 1B | 1B |
| 5 | 0B | 0B | 0B |
| 6 | 5B | 2B | 1B |
| 7 | 4B | 1B | 1B |
| 8 | 2B | 0B | 0B |
| 9 | 1B | 1B | 0B |
| 10 | 1B | 1B | 1B |

TABLE II-continued

Crosshatch Adhesion of Various Compositions to Polymer Films

| | | | |
|---|---|---|---|
| 11 | 1B | 1B | 0B |
| 12 | 5B | 5B | 1B |
| 13 | 1B | 1B | 0B |
| 14 | 2B | 5B | 5B |
| 15 | 1B | 2B | 1B |
| 16 | 3B | 4B | 3B |
| 17 | 5B | 3B | 4B |
| 18 | 4B | 0B | 0B |
| 19 | 2B | 0B | 0B |
| 20 | 5B | 5B | 2B |
| 21 | 5B | 1B | 0B |
| 22 | 5B | 5B | 5B |
| 23 | 5B | 2B | 1B |
| 24 | 5B | 1B | 0B |

| Ex. No. | ICI Melinex ® 0 Polyester | ICI Melinex ® 516 Polyester | Du Pont Kapton ® Polyimide |
|---|---|---|---|
| 1 | 5B | 5B | 5B |
| 2 | 5B | 5B | 5B |
| 3 | 1B | 1B | 1B |
| 4 | 1B | 1B | 1B |
| 5 | 0B | 0B | 0B |
| 6 | 2B | 1B | 0B |
| 7 | 2B | 1B | 1B |
| 8 | 0B | 0B | 0B |
| 9 | 0B | 0B | 0B |
| 10 | 1B | 1B | 1B |
| 11 | 1B | 1B | 0B |
| 12 | 1B | 1B | 1B |
| 13 | 0B | 0B | 0B |
| 14 | 0B | 1B | 0B |
| 15 | 2B | 1B | 0B |
| 16 | 4B | 1B | 4B |
| 17 | 5B | 0B | 0B |
| 18 | 0B | 0B | 0B |
| 19 | 0B | 0B | 1B |
| 20 | 4B | 0B | 4B |
| 21 | 0B | 0B | 0B |
| 22 | 5B | 5B | 5B |
| 23 | 5B | 5B | 1B |
| 24 | 0B | 2B | 0B |

| Ex. No. | Du Pont Ag Conductor 5007 | GE Lexan Polycarbonate Clear | GE Lexan Polycarbonate Velvet |
|---|---|---|---|
| 1 | 5B | 5B | 5B |
| 2 | 5B | 5B | 5B |
| 3 | 1B | 2B | 5B |
| 4 | 1B | 1B | 1B |
| 5 | 0B | 0B | 0B |
| 6 | 5B | 5B | 5B |
| 7 | 5B | 5B | 5B |
| 8 | 2B | 1B | 3B |
| 9 | 2B | 2B | 5B |
| 10 | 2B | 2B | 5B |
| 11 | 4B | 5B | 5B |
| 12 | 5B | 5B | 5B |
| 13 | 1B | 1B | 2B |
| 14 | 2B | 1B | 2B |
| 15 | 4B | 1B | 1B |
| 16 | 1B | 4B | 5B |
| 17 | 5B | 5B | 5B |
| 18 | 5B | 5B | 5B |
| 19 | 3B | 5B | 5B |
| 20 | 4B | 5B | 5B |
| 21 | 5B | 4B | 5B |
| 22 | 5B | 5B | 5B |
| 23 | 1B | 1B | 5B |
| 24 | 5B | 5B | 5B |

The composition of Example 1, which is the best mode of the invention, has quite excellent performance properties. These are shown in Table III below. In all of Examples 1-14 and 21-24, the Tg of the epoxy resin oligomers was above 50° C. and the Tg of the acrylated polydiene oligomers was below 20° C.

TABLE III

Performance Properties of UV Curable Dielectric Composition

| Properties on Mylar ® EL 500 Polyester Film | | Test Method |
|---|---|---|
| **Physical** | | |
| Tack-free | Yes | |
| Odor-free | Yes | |
| Abrasion Resistance | ≧H | ASTM D3363-74 |
| Flexibility | Excellent | Crease test, 180°, one cycle, ⅛ inch mandrel |
| **Adhesion, Tape Pull** | | |
| Dielectric to Polyester | Excellent | 3M Scotch ® Brand 810 tape, and FLEXcon ® V-23 acrylic adhesive |
| Dielectric to Conductor | Excellent | |
| Conductor to Dielectric | Excellent | |
| **Adhesion, Crosshatch** | | |
| Dielectric to Polyester | 5B | ASTM D3359-78, Method B |
| Conductor to Dielectric | 5B | |
| **Electrical** | | |
| Breakdown Voltage | >500 v/Mil | ASTM D150 |
| Dielectric Constant | <5 at 1 kHz | ASTM D150 |
| Insulation Resistance | $>10^{10}$ ohms/square/mil | ASTM D257 |
| **Environmental Conditions Tested** | | |
| Thermal Shock | See Footnote a | 85° C. to −40° C., ½ hr each, 5 cycles |
| Life at Elevated Temperature | | 85° C., 240 hr. (MIL-STD-202F, Method 108A, Test Condition B) |
| Humidity | | 40° C./95% RH, 240 hr. (MIL-STD-202F, Method 103B, Test Condition A) |
| Salt Spray | | ASTM B 117 |

a No change in physical properties. Insulation resistance drops less than 1 order of magnitude after humidity, thermal shock and salt spray testing.

Tradenames (1) Chemlink ® 5000 is a tradename of Sartomer Company, West Chester, PA for acrylated butadiene liquid oligomer.

(2) Hycar ® is a tradename of B.F. Goodrich Chemicals, Inc., Akron, OH for carboxyl-terminated liquid polymers.

(3) Kapton ® is a tradename of E. I. du Pont de Nemours and Company, Wilmington, DE for polyimide films.

(4) Lexan ® is a tradename of General Electric Co., Schenectady, NY for polycarbonate film.

(5) Luminar ® is a tradename of Toray Industries, Inc., Tokyo, Japan for polyester film.

(6) Melinex ® is a tradename of ICI Americas, Inc. for polyester film.

(7) Mylar ® is a tradename of E. I. du Pont de Nemours and Company, Wilmington, DE for polyester films.

(8) QC is a tradename of RPC Industries, Inc., Plainfield, IL for UV light curing apparatus.

(9) 5007 is a designation of E. I. du Pont de Nemours and Company, Wilmington, DE for polymeric silver conductive ink.

(10) Scotch ® is a tradename of 3M Corporation, Minneapolis, MN for pressure-sensitive adhesive tape.

I claim:

1. A printable dielectric composition comprising:

(a) 25–35% wt. finely divided particles of an inorganic adhesion agent selected from talc, mica and mixtures thereof dispersed in (b) 75–65% wt. curable liquid composition comprising:

(1) 20–50% wt. acrylated diene rubber-modified epoxy resin oligomer;

(2) 5–25% wt liquid elastomeric acrylated polydiene oligomer different from b-1 ; and (3) 35–75% wt. alkyl acrylate.

2. A printable dielectric composition comprising:

(a) 25–35% wt. finely divided particles of an inorganic adhesion agent selected from talc, mica and mixtures thereof dispersed in (b) 75–65% wt. curable liquid composition comprising:

(1) 20–50% wt. acrylated diene rubber-modified epoxy resin oligomer;

(2) 5–25% wt. liquid elastomeric acrylated polybutadiene oligomer different from b-1;

(3) 30–60% wt. monofunctional alkyl acrylate; and (4) 5–15% wt. difunctional alkyl acrylate.

3. The composition of claim 2 in which the proportions of the components in the curable liquid composition are:

(1) 35–45% wt.

(2) 7.5–15% wt.

(3) 35–45% wt.

(4) 7.5–15% wt.

4. The composition of claim 1 which contains up to 5% wt. inert pigment.

5. The composition of claim 1 which is UV curable and contains 0.1–10% wt. photoinitiator.

6. The composition of claim 1 in which the inorganic particles are treated with a silane coupling agent.

7. The composition of claim 1 which contains additionally 0.1–2.0% wt. by weight of a printing aid.

* * * * *